(12) United States Patent
Lin et al.

(10) Patent No.: US 9,094,801 B2
(45) Date of Patent: Jul. 28, 2015

(54) METHOD AND SYSTEM FOR ENABLING MULTICAST DISTRIBUTION OF MOBILE DEVICE UPDATE DATA

(71) Applicant: Verizon Patent and Licensing Inc., Basking Ridge, NJ (US)

(72) Inventors: Te-sheng Lin, Cresskill, NJ (US); Lily F. Chen, Fort Lee, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 37 days.

(21) Appl. No.: 13/742,063

(22) Filed: Jan. 15, 2013

(65) Prior Publication Data

US 2014/0198702 A1  Jul. 17, 2014

(51) Int. Cl.
*H04W 4/06* (2009.01)
(52) U.S. Cl.
CPC ...................................... *H04W 4/06* (2013.01)
(58) Field of Classification Search
USPC .......................................... 370/432, 473, 312
See application file for complete search history.

(56) References Cited

U.S. PATENT DOCUMENTS

| 7,653,680 | B2 * | 1/2010 | Itaba et al. ..................... 709/201 |
| 2009/0147718 | A1 * | 6/2009 | Liu et al. ........................ 370/312 |
| 2012/0135719 | A1 * | 5/2012 | Haughn ..................... 455/414.1 |
| 2012/0158983 | A1 * | 6/2012 | Glasser et al. ................ 709/230 |
| 2013/0173817 | A1 * | 7/2013 | Field et al. ..................... 709/231 |
| 2013/0188547 | A1 * | 7/2013 | Moriwaki et al. ............ 370/312 |
| 2014/0068592 | A1 * | 3/2014 | Chitre et al. .................. 717/171 |

FOREIGN PATENT DOCUMENTS

CN   101383720 B  *  5/2011

OTHER PUBLICATIONS

Chinese-to-English translation of CN101383720B to Duan et al., published May 11, 2011, retreived from the Internet May 25, 2014.*

* cited by examiner

*Primary Examiner* — Benjamin H Elliott, IV

(57) ABSTRACT

An approach for enabling load efficient delivery of updates and other content to mobile devices is described. A device management platform determines to communicate with a mobile device configured to operate over a cellular network and a local area network, wherein the local area network includes a customer premise gateway. The device management platform also initiates establishment of a multicast session with the mobile device via the customer premise gateway and over the local area network.

20 Claims, 9 Drawing Sheets

304

300

316

312

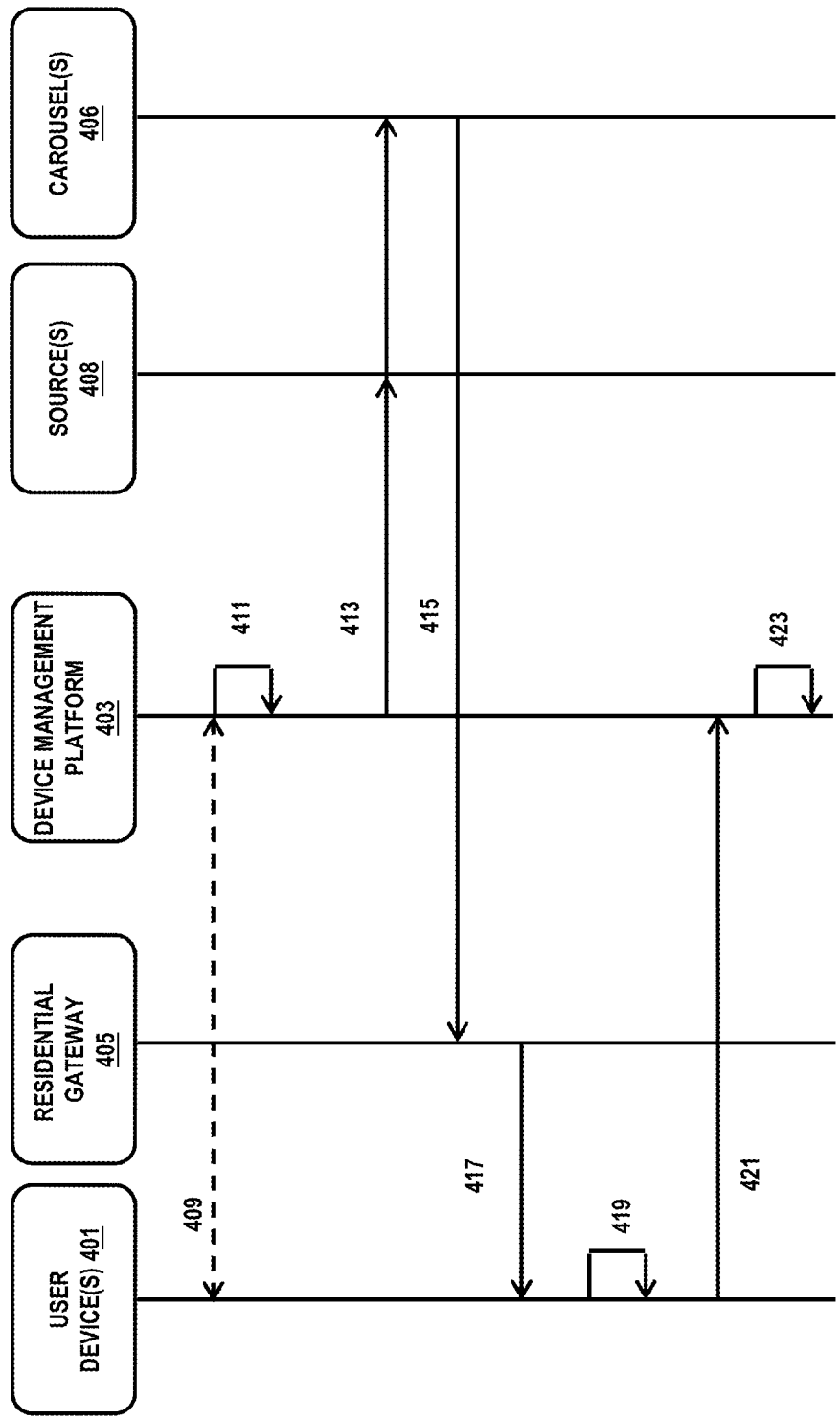

METHOD AND SYSTEM FOR ENABLING MULTICAST DISTRIBUTION OF MOBILE DEVICE UPDATE DATA

BACKGROUND INFORMATION

Service providers, such as wireless services providers, are continually challenged to deliver value and convenience to consumers by providing compelling network solutions. One area of particular interest is ensuring the software and firmware related to devices configured to a communication network are continually updated. Typically, the update procedure is performed periodically by way of a unicast transmission procedure, wherein the update data is directed to each individual device by way of the communication network. However, delivery of the update data and or other content directly via the communication network further increases the load placed upon the network.

Based on the foregoing, there is a need for enabling load efficient delivery of updates and other content to mobile devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 4 is a ladder diagram depicting interaction between various elements of the system of FIG. 1, according to one embodiment;

DESCRIPTION OF THE PREFERRED EMBODIMENT

An apparatus, method and software for enabling load efficient delivery of updates and other content to mobile devices is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
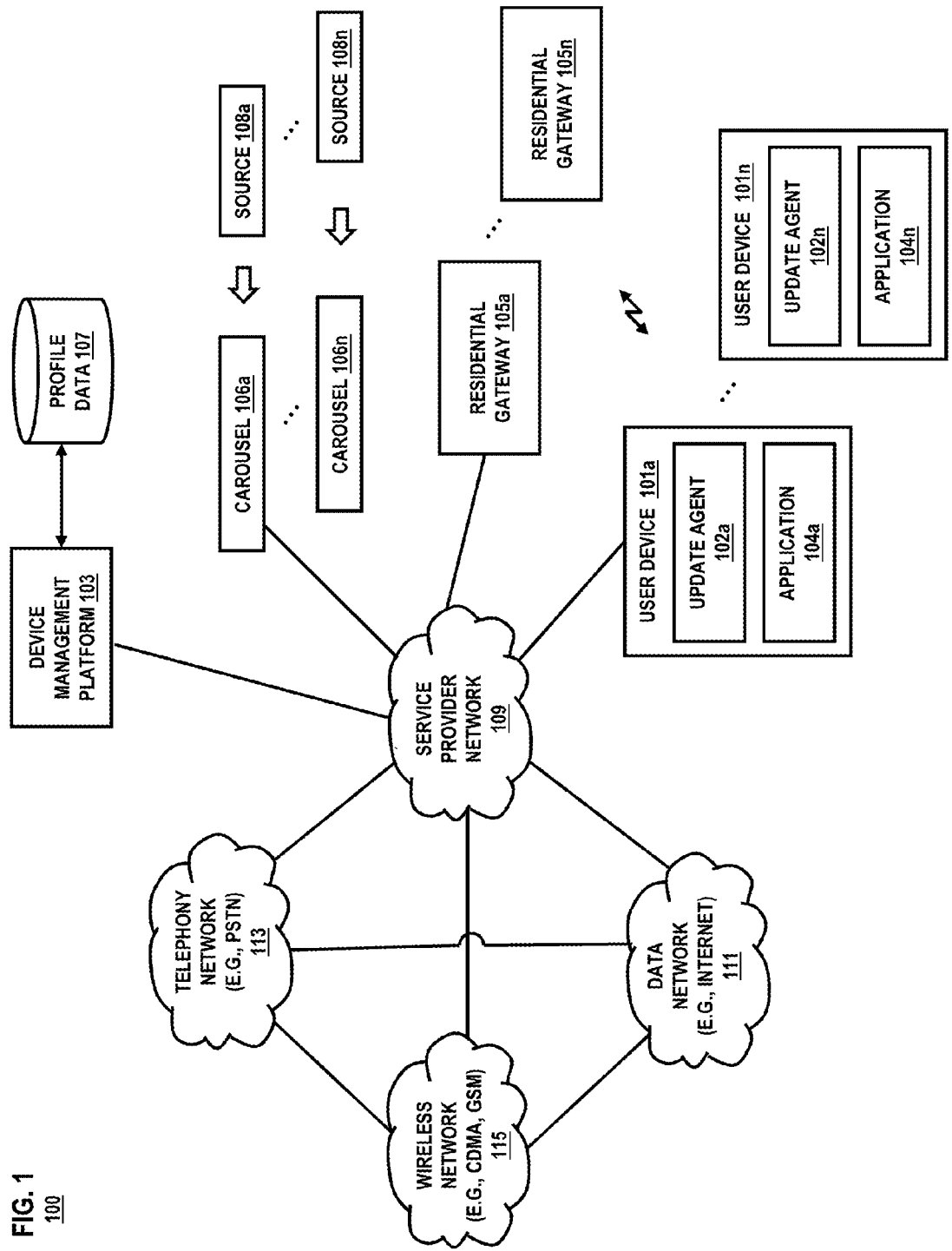
FIG. 1 is a diagram of a system for enabling load efficient delivery of updates and other content to mobile devices, according to one embodiment.

FIG. 1 is a diagram of a system for enabling load efficient delivery of updates and other content to mobile devices, according to one embodiment. For the purpose of illustration, the update data may include any code, firmware, objects, instructions, patches or the like to be rendered, installed or otherwise executed by user devices 101a-101n. This data may be packaged for distribution as one or more software features, operating system features, device level component features, bug fixes or the like. Hence, the user devices 101a-101n that receive the data may be any type of mobile terminal or portable terminal including a mobile handset, multimedia tablet, Internet node, laptop computer, Personal Digital Assistants (PDAs), smartphone or the like. As will be discussed more fully later herein, a device management platform 103 may be configured to operate in connection with a residential gateway 105 associated with the user devices 101a-101n (referred to herein as user devices 101) for facilitating transmission of update data (or an update package) as well as other content.

Currently, most network providers (e.g., cellular network providers) employ firmware-over-the-air (FOTA) as a scheme or technology for distributing update data wirelessly to subscribed user devices 101. This means of distribution of update data has increased due to the vast amount of software embedded on user devices; wherein updating of the device features and software is enormously challenging once the device is with the user. By way of example, FOTA schemes require the unicast transmission of update data to individual user devices 101 directly via the service provider network (e.g., wireless network 115). However, as the number of user devices 101 subscribed to the network increases, so does the overall traffic load incurred by the network as well as the servers associated with the network that provide the update data. This issue is exacerbated by the increasing amount of traffic incurred by the network due to the growing use of online games, video-on-demand and other data rich services by the user devices 101a-101n. Unfortunately, there is currently no convenient means for enabling service providers to seamlessly deliver update data and other content (e.g., movies, music) to devices 101 without taxing the already limited bandwidth resources of the network.

To address this issue, system 100 presents a device management platform 103 that is configured to facilitate delivery of update data and other content to user devices via an internet telephony (IP) multicast transmission scheme. In addition, the device management platform 103 operates in connection with respective user devices 101 to manage the update process from start to finish. In certain embodiments, the device management platform 103 may be implemented as a hosted solution for access via the network 109, as an integrated/modular solution of a user device 101 or node 102, or a combination thereof.

By way of example, IP multicast transmission refers to any protocols or methodologies for enabling delivery of information (e.g., update data or other content) to a group of destination nodes (e.g., user devices 101a-101n) simultaneously by way of single session from a source 108 location. As such, IP multicast transmission protocols may be employed for use at the IP routing level, where a network component (e.g., a carousel or server device) creates an optimal distribution path via an IP network for datagrams sent to a specified destination address. This approach to delivery contrasts with FOTA or other approaches reliant upon unicast transmission, wherein data transmission is conveyed directly over a wireless/cellular communication network 115 of the service provider network 109.

For the purpose of illustration, one or more networks, such as data network 111, telephony network 113 and/or wireless/cellular network 115 can interact with the service provider network 109. Reference herein to the service provider network 109 may include networks 111-115. The networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

As another example, wireless network 115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. It is noted that traditional data deployment schemes such as FOTA are carried out primarily over the wireless network via unicast transmission.

Meanwhile, data network 111 may be any local area network (LAN), metropolitan area network (MAN), wide area network (WAN), the Internet, or any other suitable packet-switched network, such as a commercially owned, proprietary packet-switched network. In addition, the data network 111 may be implemented by way of a proprietary cable or fiber-optic network. Still further, the network 111 may be implemented by way of various network components, such as a residential gateway 105a-105n. The residential gateway 105a-105n, referred to herein as residential gateways 105, may be configured within a premise such as an office or home. In certain implementations, the residential gateway 105 may also serve as a wireless point of access to the service provider network 109 for user devices 101 having the appropriate credentials and permissions for interacting with the residential gateway 105.

In certain embodiments, the device management platform 103 facilitates multicast transmission of update data and other content via the data network 111 to the residential gateways 105 associated with respective user devices 101. By way of example, the update data or content is mapped into a set of multicast groups that are assigned to unique multicast group address. As such, when the residential gateway 105 is mapped to one of the unique addresses, the gateway receives the update data or content as cast by the source 108. The residential gateway 105 then forwards the update data or content to the user devices 101 accordingly, i.e., to those devices that are members of the same multicast group to which the residential gateway 105 is assigned.

In certain embodiments, the sources 108a-108n, referred to herein collectively as sources 108, may include any data warehouse, server or data repository for maintaining update data (e.g., software updates, firmware). Also, in addition to update data, the sources 108 may house streaming content, gaming content, advertisement information, or any other content. The device management platform 103 may be configured to submit requests for delivery of update data, such as according to an update schedule maintained for respective devices 101 in association with profile data 107. Depending on the requirements of the service provider, the sources 108 may be maintained directly by the provider of the network 109 or by a third-party provider affiliated with the network 109.

In certain embodiments, the sources 108 may be configured to operate in conjunction with a carousel device 106a-106n. The carousel device, referred to herein as carousel 106, may be implemented as a server or other device that continuously streams the update data and other content to respective multicast groups. Hence, in the case where the various residential gateways are assigned to a multicast group, the carousel 106 ensures continuous streaming of the data to the residential gateways 105. By way of example, the carousel 106 may operate along with the source 108 according to an active-active mode of operation, wherein different multicast source 108 addresses are employed for enabling multicast transmission of the update data or content. Per this execution, the update data may be obtained in whole or part from disparate source locations. Alternatively, the carousel 106 may be set to operate according to an active-standby mode, wherein only a single multicast source 108 address is specified for redundancy.

In certain embodiments, the user devices 101 configured to interact with the residential gateway 105 may feature an update agent 102a-102n (referred to herein as update agent 102) and/or associated application 104a-104n (referred to herein as application 104a) for facilitating the downloading of update data or content to the device 101. By way of example, the application 104 may be client software having instructions for performing physical downloading of the update data or content to the device 101. Alternatively, the application 104 may pass control of the download procedure to a separate update agent 102. The application 104 and/or update agent 102 facilitate passage of the update data to the device 101 or software operating thereon per the device operating system or per an embedded device management tree architecture of the device 101. This may include, for example, enabling bootstrapping execution, synchronization of the update data or content with existing data sets, unpacking of the data, computing which regions of the platform memory need to be changed (e.g., per the device management tree), enabling a fail-safe mechanism for firmware/software updates, etc.

In certain embodiments, the application 104 and/or update agent 102 may facilitate the rendering of prompts to a display of the user of the device 101 for specifying the status or details regarding the update procedure. This may include, for example, the rendering of a prompt for receiving user acknowledgement or acceptance of the update data or content in response to detection of the data via the multicast broadcast (per the gateway 105). In addition, the agent 102 or application 104 may render a message for indicating the success or failure of the update data or content for execution by the user device 101.

Still further, in certain implementations, the update agent 102 and/or application 104 may be configured to interact with the device management platform 103 for conveying the results of the update procedure. For example, the agent 102 and/or application 104 may submit a confirmation message to the platform 103 for indicating user acceptance of the update data or content as transmitted via the residential gateway 105. Based on this feedback, the device management platform 103 is then able to update profile data 107 associated with the accepting device 101 for indicating that the update was made. In addition, the update agent 102 and/or application 104 may be configured to periodically convey device characteristic data to the device management platform 103, including current software version information, operating system and/or device feature information and the like. By way of this information, the device management platform 103 can maintain a current status of the device 101 for comparison against a release schedule for update data or content.

In certain embodiments, a user of a residential gateway 105, user device(s) 101, or a combination thereof may register with the device management platform 103 to enable multicast session based delivery of the update data and other content. The registration may be performed by way of a configuration interface of the provider of the network 109 or via one or more settings options at the user device 101. By way of example, the settings may include a specification of the IP address of the residential gateway as well as the multicast groups the gateway is to be mapped (e.g., as associated with the sources). The mapping may be specified automatically based on the type of software or device 101 features to be updated. In addition, the settings may include a specification of the number of devices to be configured for multicast session interaction as well as their corresponding device identifiers.

It is noted that the system 100 may operate within any service provider network 109 implementation, including those wherein the data network 111 and wireless network 115 are not associated with a common service provider network 109. For example, per the device management platform 103, the cellular network provider may differ from the internet service provider. This is due in part, to the hybrid architectural approach of the system 100, wherein distribution of the update data or content is facilitated via an IP based communication protocol (e.g., multicast protocol) for execution by user devices 101 configured to the wireless/cellular network 115.

As an advantage, the above described approach of system 100 enables the update data or content to be offloaded from the wireless/cellular network 115 of a service provider 109 to an internet service provider (e.g., data network 111). This reduces the reliance upon unicast delivery of update data or content via the cellular network while leveraging the ISP managed network associated with the user device 101.

As another advantage, the approach described herein per system 100 reduces the update data and content delivery costs of the service provider. This is because the device management platform 103 may be configured to facilitate distribution/pushing of e-media, e-learning, UI customization (skins, icons and menu), targeted advertisements, and other content for revenue generating activities. By way of example, gaming content may be transmitted from the source 108 to a residential gateway 105 of a registered user device 101 for enabling in home stream delivery via the multicast enabled network of the internet service provider. As yet another advantage, system 100 is a readily scalable solution. For example, as the number of user devices 101 subscribed to the cellular network increases, there is no associated degradation of network performance.

Figure 2:
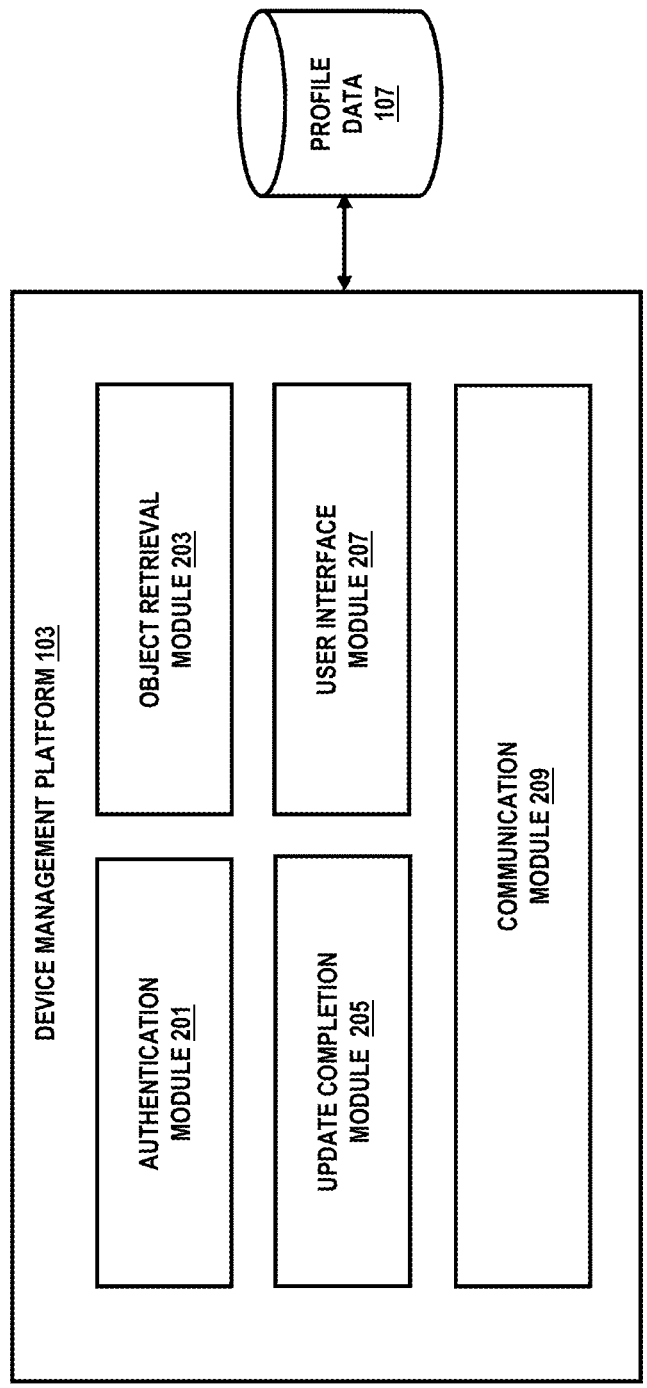
FIG. 2 is a diagram of a device management platform, according to one embodiment.
Figure 3B:
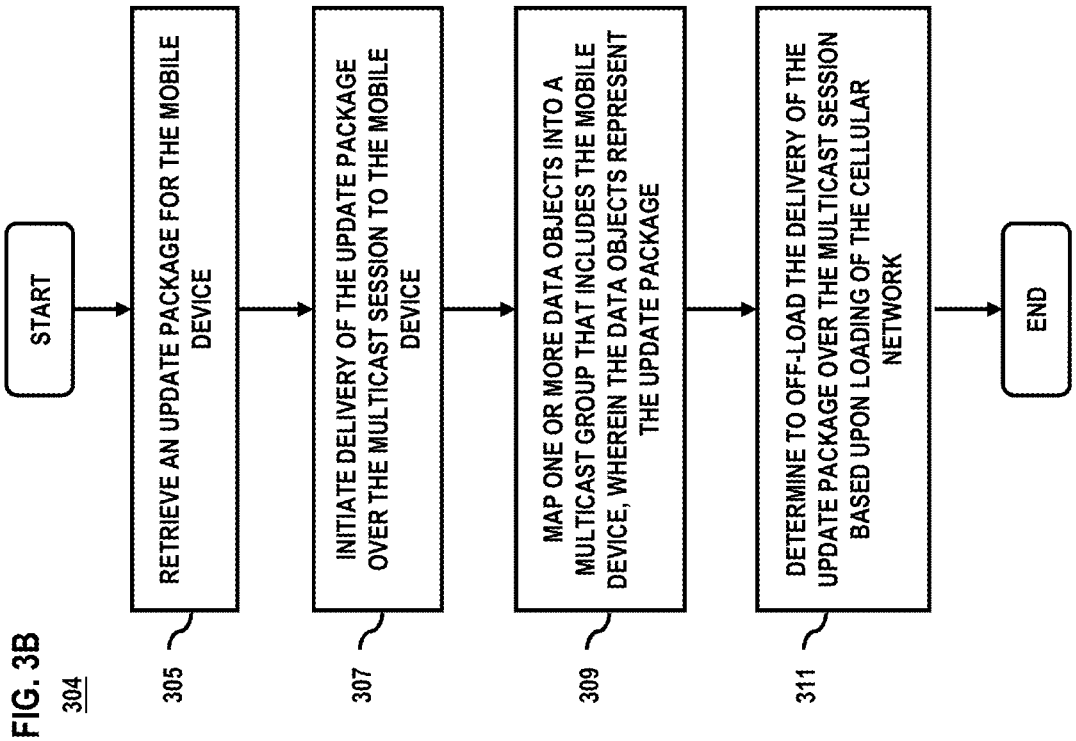
FIGS. 3A-3D are flowcharts of processes for enabling load efficient delivery of updates and other content to mobile devices, according to various embodiments.
Figure 3A:
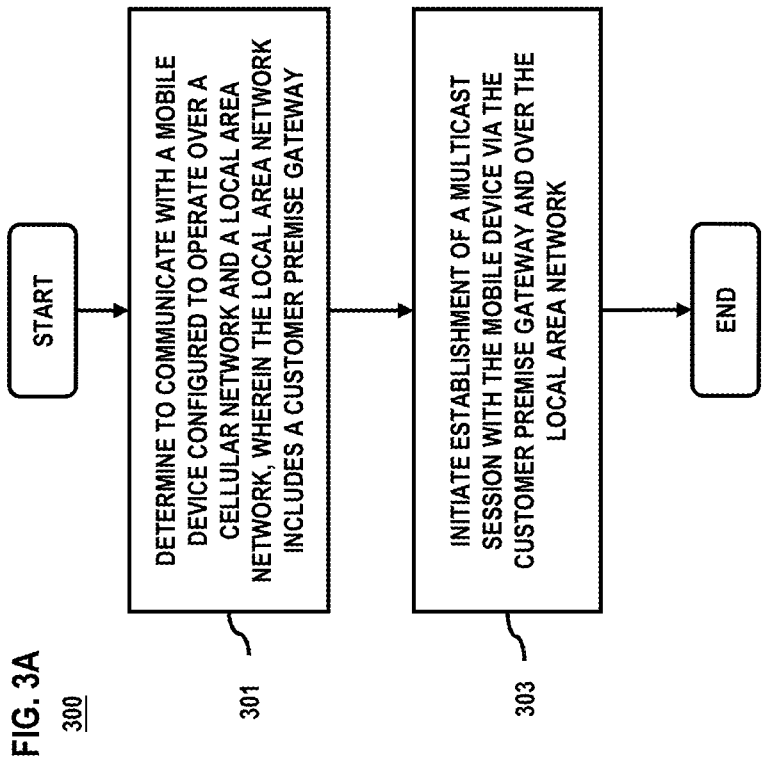
Figure 3D:
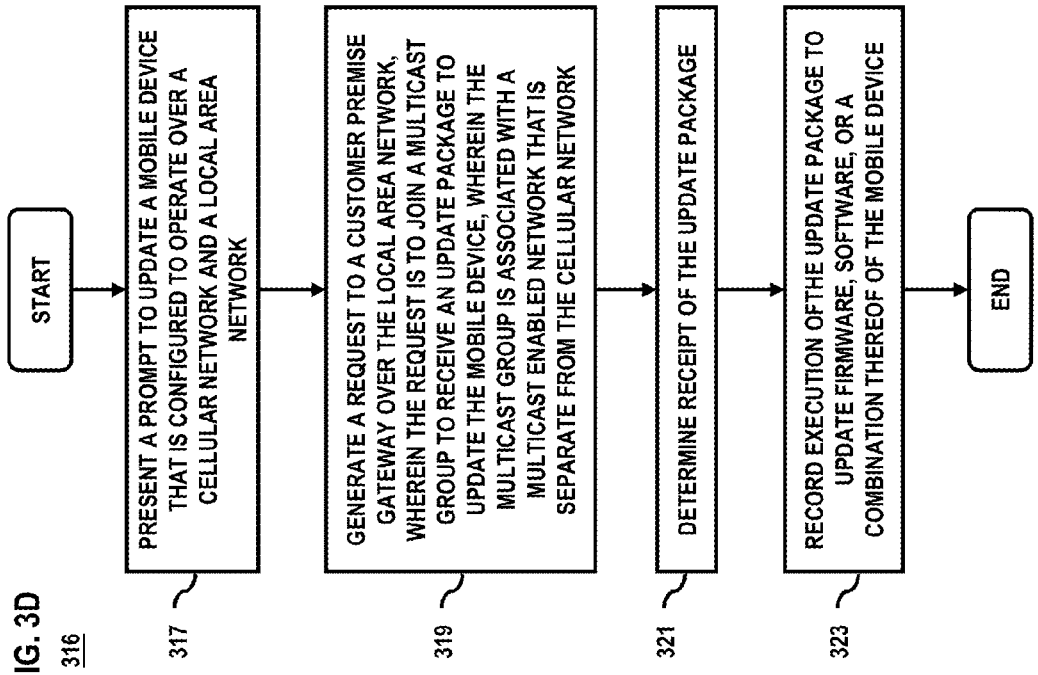
Figure 3C:
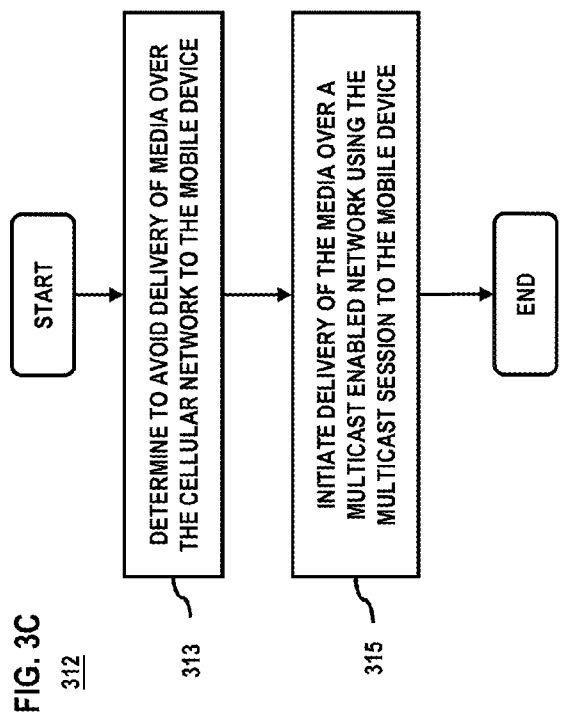

FIG. 2 is a diagram of a device management platform, according to one embodiment. The device management platform 103 includes various executable modules for performing one or more computing, data processing and network based instructions that in combination provide a means of enabling load efficient delivery of updates and other content to mobile devices. Such modules can be implemented in hardware, firmware, software, or a combination thereof. By way of example, the device management platform 103 may include an authentication module 201, a object retrieval module 203, a update completion module 205, a user interface module 207 and a communication module 209. In addition, the device management platform 103 also accesses profile data from a database 107.

In one embodiment, an authentication module 201 authenticates user devices 101 for interaction with the device management platform 103. By way of example, in the case of a user device 101, the authentication module 201 receives a request to associate a residential gateway configured at a premise of the user of the device with the profile data associated with the device 101. This may include, for example, specifying of an IP address of the residential gateway 105. In addition, the authentication module may facilitate mapping of the residential gateway with specific multicast groups based on the type of software and/or device 101 features to be updated. In addition, the settings may include a specification of the number of devices to be configured for multicast session interaction as well as their corresponding device identifiers.

It is noted the registration procedure may be performed through automated association of profile information maintained by a provider of the network 109 with an IP address, a carrier detection signal of a user device, mobile directory number (MDN), subscriber identity module (SIM) (e.g., of a SIM card), radio frequency identifier (RFID) tag or other identifier. Under this scenario, the authentication module 203 may operate in connection with the communication module 211 to facilitate the retrieval of the profile information.

The authentication module 201 may also be configured to receive feedback information from the update agent 102 or application 104 of a respective device 101. The feedback information may include device status information as well as update status details in response to initiation of an update. Still further, the authentication module 201 may operate in connection with a user interface module 205 for enabling the downloading of the update agent 102 or application 104 to the device per the authentication procedure.

In certain embodiments, the object retrieval module 203 retrieves profile data 107 pertaining to the devices 101 that are to be updated. The module 203 then performs a lookup against the profile data 107 associated with the devices 101 to determine which specific software, firmware or other components of the device 101 require updating. This corresponds to a determination of the specific data sources 108, i.e., source locations, which the update data and/or content are to be retrieved from. It is noted that the retrieval process may be performed periodically by the module 203, such as in accordance with an update cycle or schedule defined by the network service provider or the user (e.g., a user setting for indicating updating of a mapping application one time per month).

By way of example, the module 203 may compare a current version of firmware or software of the device 101 against the active firmware or software version list. If the active version is determined to be outdated, the module 203 may submit a request for transmission of the appropriate source objects from the sources 108 accordingly. It is noted that the request may include a specification of the multicast group address to which the residential gateway 105 of the user device 101 is assigned. In addition, the object retrieval module 203 may initiate a mode of operation of the carousel 106 for carrying out the multicast transmission to the gateway 105. For example, the module 203 may specify an active-active mode of operation or an active-standby mode be employed by the carousel 106.

In certain embodiments, the update completion module 205 manages and tracks the update procedure lifecycle from the moment of update initiation to installation and reporting. This includes, for example, ensuring firmware update (delta) submission are retrieved from all sources 108. In addition, the module 205 may interact with the user interface module 207 to receive user feedback regarding the update data and/or content. For example, in response to a prompt initiated for rendering by the user interface module 207 for indicating availability of an update, the update completion module 205 may log the user approval and/or acknowledgement of the update data and/or content. In addition, the update completion module 205 may verify and/or acknowledge proper triggering of the update data for download as well as installation and test of the update data at the user device 101.

Once this feedback is gathered, the update completion module 205 also updates the profile data 107 for the device to specify the current updated status of the software and/or firmware subject to the update. This may include updating a list, as associated with the profile data 107, for specifying current software versions, version dates, etc.

In one embodiment the user interface module 207 enables presentment of a graphical user interface for initiation the rendering of prompts to a display of the user of the device 101. The prompts may be rendered in the form of a message for indicating the status of the update procedure or details related thereto. The prompt may also be a message for receiving user acknowledgement or acceptance of the update data or content in response to detection of the data via the multicast broadcast (per the gateway 105). By way of example, the user interface module 215 generates the interface in response to application programming interfaces (APIs) or other function calls corresponding to the application 104 of the user devices 101 or sharing application 105 of the nodes 102; thus enabling the display of graphics primitives.

In one embodiment, a communication module 209 enables formation of a session over a network 109 between the device management platform 103, the sources 108, and respective residential gateways 105 of the user devices 101. By way of example, the communication module 211 executes various protocols and data sharing techniques for enabling data exchange over the network 109. It is noted also that the communication module 209 may be configured to interact with a carousel device or service to which the source 108 is associated.

The above presented modules and components of the device management platform 103 can be implemented in hardware, firmware, software, or a combination thereof. For example, though depicted as a separate entity in FIG. 1, it is contemplated the device management platform 103 may be implemented for direct operation by respective devices 101 or even integrated for use with a residential gateway 105. As such, the device management platform 103 may generate direct signal inputs by way of the internal operating system for interacting with the application 104 and interfacing with a corresponding sharing application 106 of nodes 102. In another embodiment, one or more of the modules 201-209 may be implemented for operation by respective devices 101 as a hosted solution.

Figure 7:
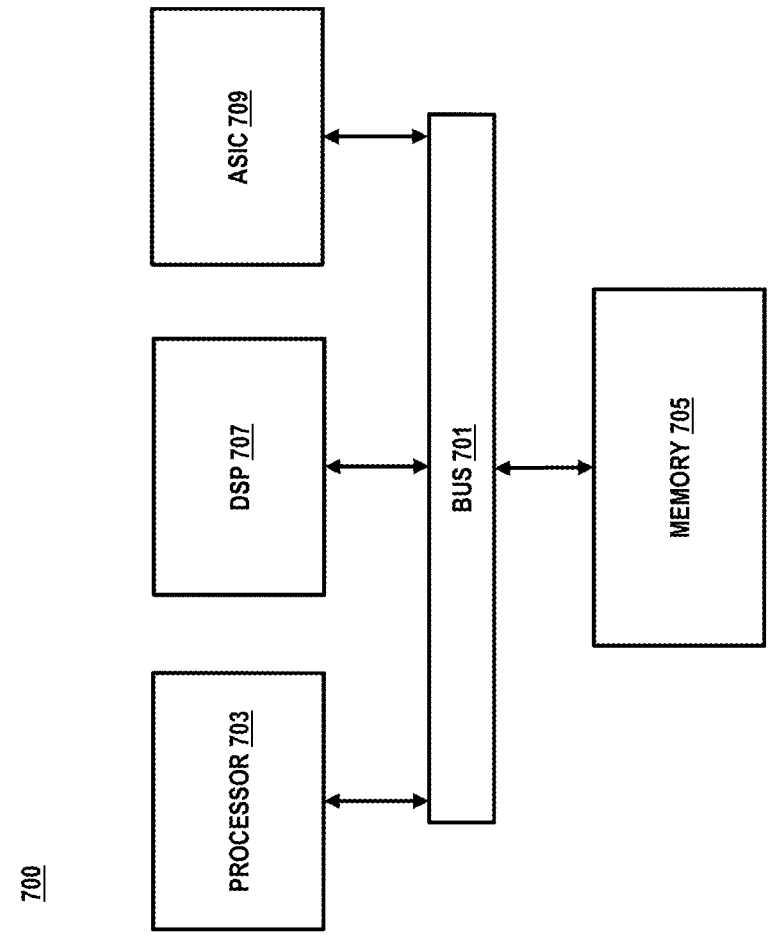
FIG. 7 is a diagram of a chip set that can be used to implement an embodiment of the invention.

FIGS. 3A-3D are flowcharts of processes for enabling load efficient delivery of updates and other content to mobile devices, according to various embodiments. In one embodiment, the device management platform 103 performs processes 300, 304, 312 while the user device operates in connection with the update agent 102 or application 104 performs process 316. These procedures may be implemented in, for instance, a chip set including a processor and a memory as shown in FIG. 7.

In step 301, the device management platform 103 determines to communicate with a mobile device configured to operate over a cellular network and a local area network, wherein the local area network includes a customer premise gateway. As noted previously, the customer premise gateway may include network devices such as routers or servers configured within a customer premise such as a home or office. In another step 303, the platform 103 initiates establishment of a multicast session with the mobile device via the customer premise gateway and over the local area network.

In step 305 of process 304 (FIG. 3B), the device management platform 103 retrieves an update package for the mobile device. In another step 307, the platform 103 initiates delivery of the update package over the multicast session to the mobile device. In another step 309, the platform 103 maps one or more data objects into a multicast group that includes the mobile device. It is noted that the data objects represent the update package, the objects including code to update firmware, software, or a combination thereof of the mobile device.

Still further, per step 311, the platform 103 determines to off-load the delivery of the update package over the multicast session based upon loading of the cellular network. This may include, for example, a determined network load condition of the cellular network.

In step 313 of process 312 (FIG. 3C), the device management platform 103 determines to avoid delivery of media over the cellular network to the mobile device. As noted, this corresponds to delivery of the media, such as advertisement content or gaming content, to the mobile device through the residential gateway. In step 315, the platform 103 initiates delivery of the media over a multicast enabled network using the multicast session to the mobile device. It is noted that the multicast enabled network may be that associated with the internet service provider of the user as employed for execution of the local area network.

In step 317 of process 316 (FIG. 3D), the update agent 102 and/or application 104 of the user device 101 presents a prompt to update a mobile device that is configured to operate over a cellular network and a local area network. In another step 319, a request is generated to a customer premise gateway over the local area network. The request is to join a multicast group to receive an update package to update the mobile device. As noted, the multicast group is associated with a multicast enabled network that is separate from the cellular network.

In another step 321, the update agent 102 and/or application of the user device 101 determines receipt of the update package. This may correspond to a receipt of user input for indicating acceptance and/or acknowledgement of the update per the prompting step 317. Per step 323, execution of the update package at the device to update firmware, software, or a combination thereof of the mobile device is recorded.

As noted previously, the recorded execution data may be submitted subsequently to the device management platform 103 as feedback information. The device management platform 103 may then perform various follow-up procedures or update profile data related to the user device in response to the outcome of the update. In addition, a request to drop membership with (unjoin) the multicast group may be submitted by the application and/or update agent in response to fulfillment of the update.

FIG. 4 is a ladder diagram depicting interaction between various elements of the system of FIG. 1, according to one embodiment. For the purpose of illustration, reference to the user device 401 may be associated with the execution of the update agent 102 and/or application 104 of the device 101 accordingly.

In step 411 of FIG. 4, the device management platform 403 determines an update to specific software, firmware or a combination thereof for the user device 501 is required or available. The update may be triggered (optionally), per step 409, based on device and/or software status information periodically exchanged with the platform 403 by the user device 101. As another example, the update may be triggered automatically according to a periodic update schedule maintained by the device management platform 403 per profile data for the user device 501. As yet another example, the update may be triggered based on updating of data maintained by the source 408. This may correspond to a push service implementation, wherein newly added data at the source 408 is immediately transmitted to a subscribed recipient to the source data.

In response to the update need, per step 413 the device management platform 403 submits a request for delivery of the update package (e.g., update data or content) to the source 408. This step may also pertain to initiating of the carousel 406 for transmission of the update data or content from the multicast source 408 to the corresponding multicast group address (e.g., corresponding to the residential gateway 405). In step 415, the update data or content is then sent to the gateway, which further casts the update data or content to the target user devices 401 per step 417.

Once the multicast session is formed with the user device 401, the update data or content is executed per step 419. The execution may include, for example, rendering prompts for receiving user acceptance or rejection of the update data or content. This may also include unpacking the update packages and computing which regions of the device memory need to be updated accordingly in response to acceptance of the update data or content. In step 421, the user device 401 may submit feedback information to the device management platform 403 for indicating the status and/or outcome of the update. This step may also correspond to submission of a request to the residential gateway 405 to close the group multicast session upon completion of the update.

In yet another step 423, in response to the feedback information, the device management platform 403 updates the profile for the user device 401. This may include adapting a software or firmware version number, an update date, a device status, etc. In addition, the update schedule associated with the software or firmware components of the device 401 may be adapted to account for the most recent update occurrence.

Figure 5A:
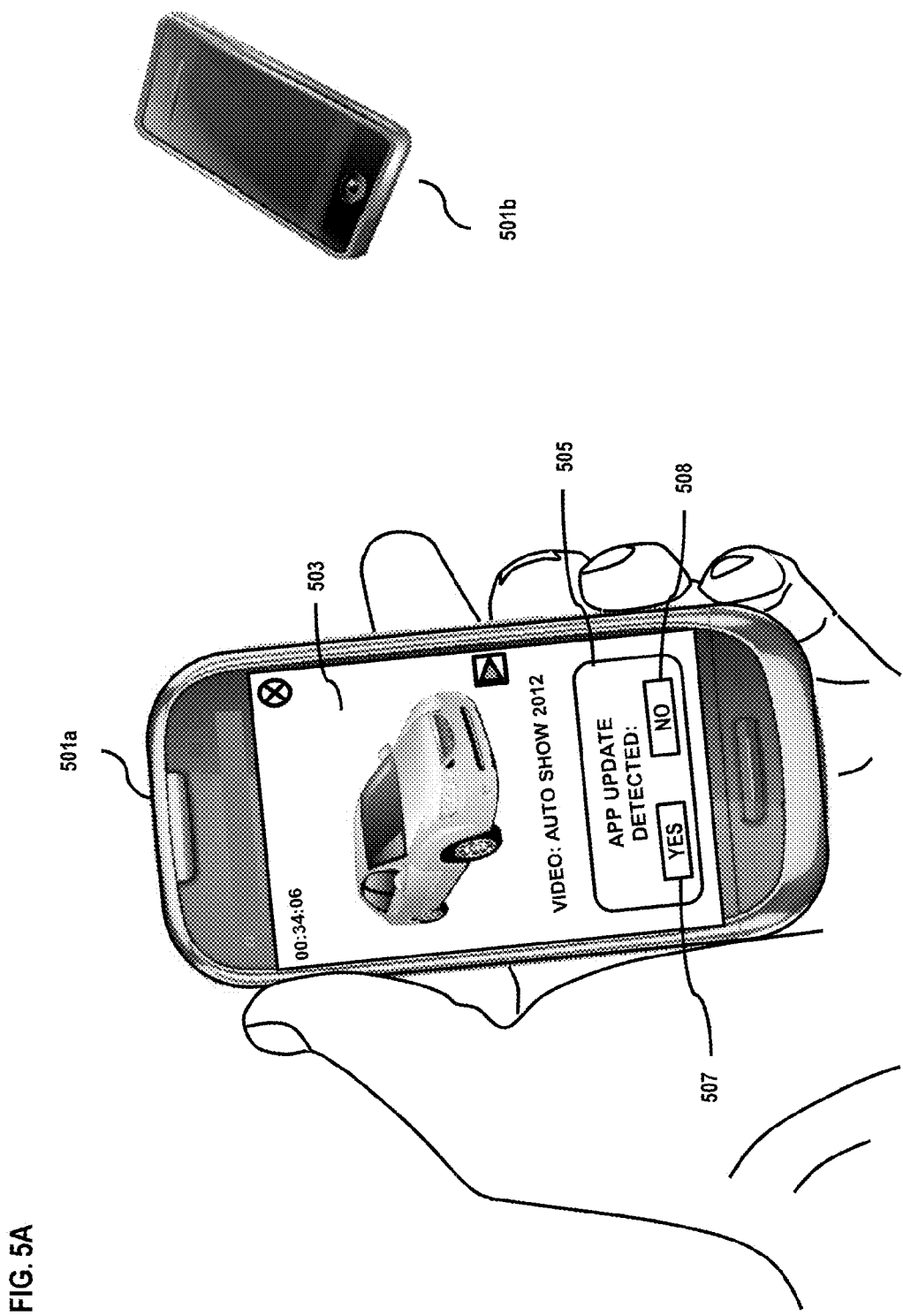
FIGS. 5A and 5B are diagrams depicting a device update procedure, according to various embodiments.
Figure 5B:
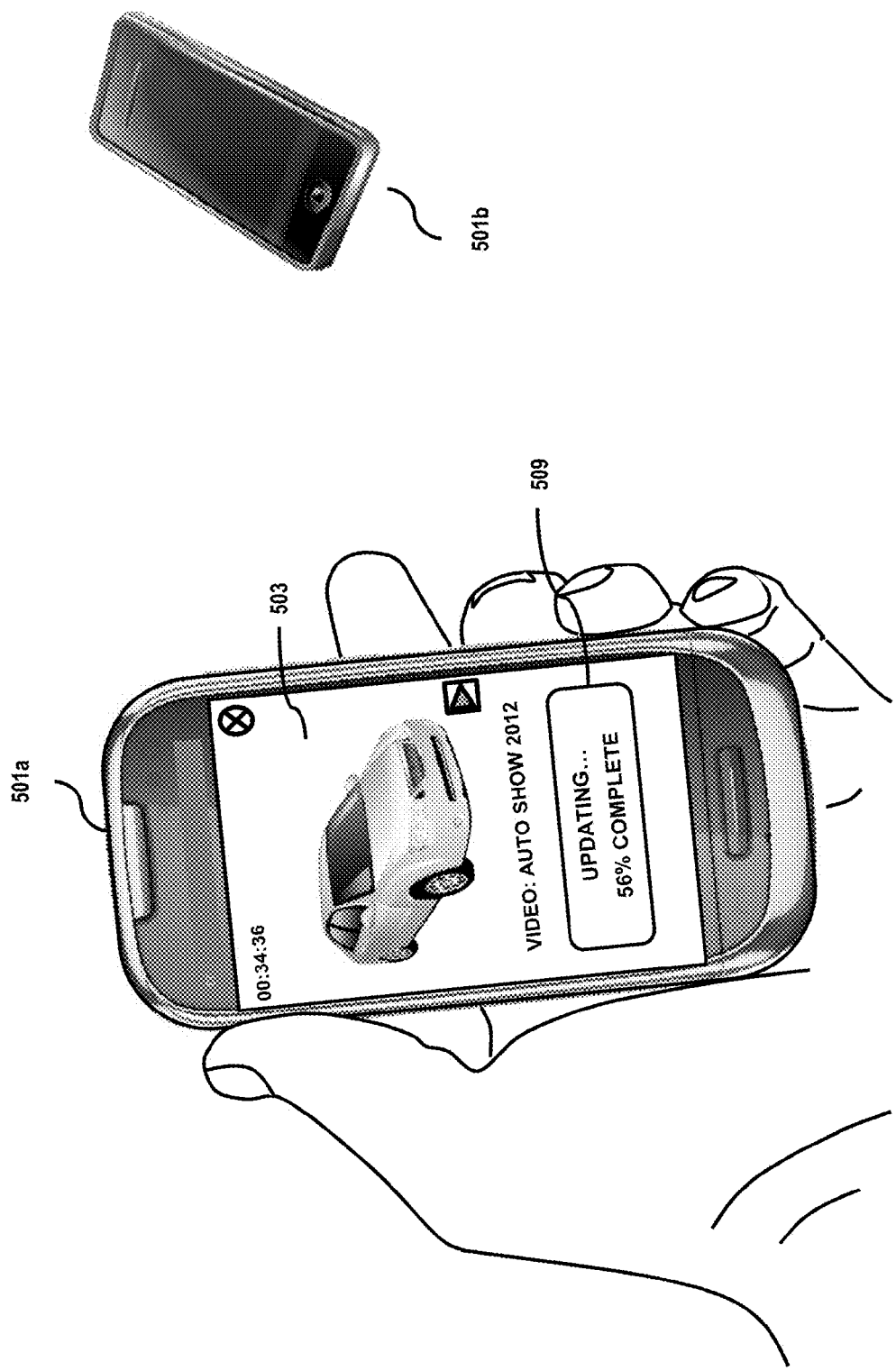

FIGS. 5A and 5B are diagrams depicting a device update procedure, according to various embodiments. For illustration purposes, the figures are presented from the perspective of multiple user devices 501a and 501b being updated, both of which are associated with the same user. Still further, both of the user devices 501a and 501b are configured to interact with a residential gateway that also belongs to the same user. While not shown, the device management platform 103 facilitates the update procedure in conjunction with the devices 501a, 501b and residential gateway accordingly.

In FIG. 5A, the device management platform initiates a rendering of a prompt 505 to a display 503 of the user device 501a for indicating the availability of an update. Under this scenario, the prompt 505 is triggered in response to a determination by the platform that additional updates corresponding to a video player application of the device is available at the source. As such, the prompt 505 includes YES and NO action buttons 507 and 508 respectively for receiving user acknowledgement/acceptance or rejection of the update.

In FIG. 5B, in response to user acceptance of the update (per selection of action button 507), the device management platform 103 initiates a rendering of a status prompt 509 to the display 503 of the user device 501a. Under this scenario, the status prompt 509 indicates a current status or progress of the update procedure. It is noted that the device management platform 103 operates in connection with an update agent 102 or application 104 of the device to facilitate the loading of the update data to the specific components of the application requiring updating.

While not shown, the same user interface executions shown with respect to device 501a may occur at device 501b with respect to the same application. It is noted, however, that while multicast transmission of the update data from the gateway occurs for both devices simultaneously, acceptance of the update may occur at different times depending on the status of the device (e.g., device off or on). In this case, the update may be resumed automatically upon activation of the device as a result of persistent recasting of the update data via the carousel to the gateway and based on feedback information regarding the update.

The processes described herein for enabling load efficient delivery of updates and other content to mobile devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
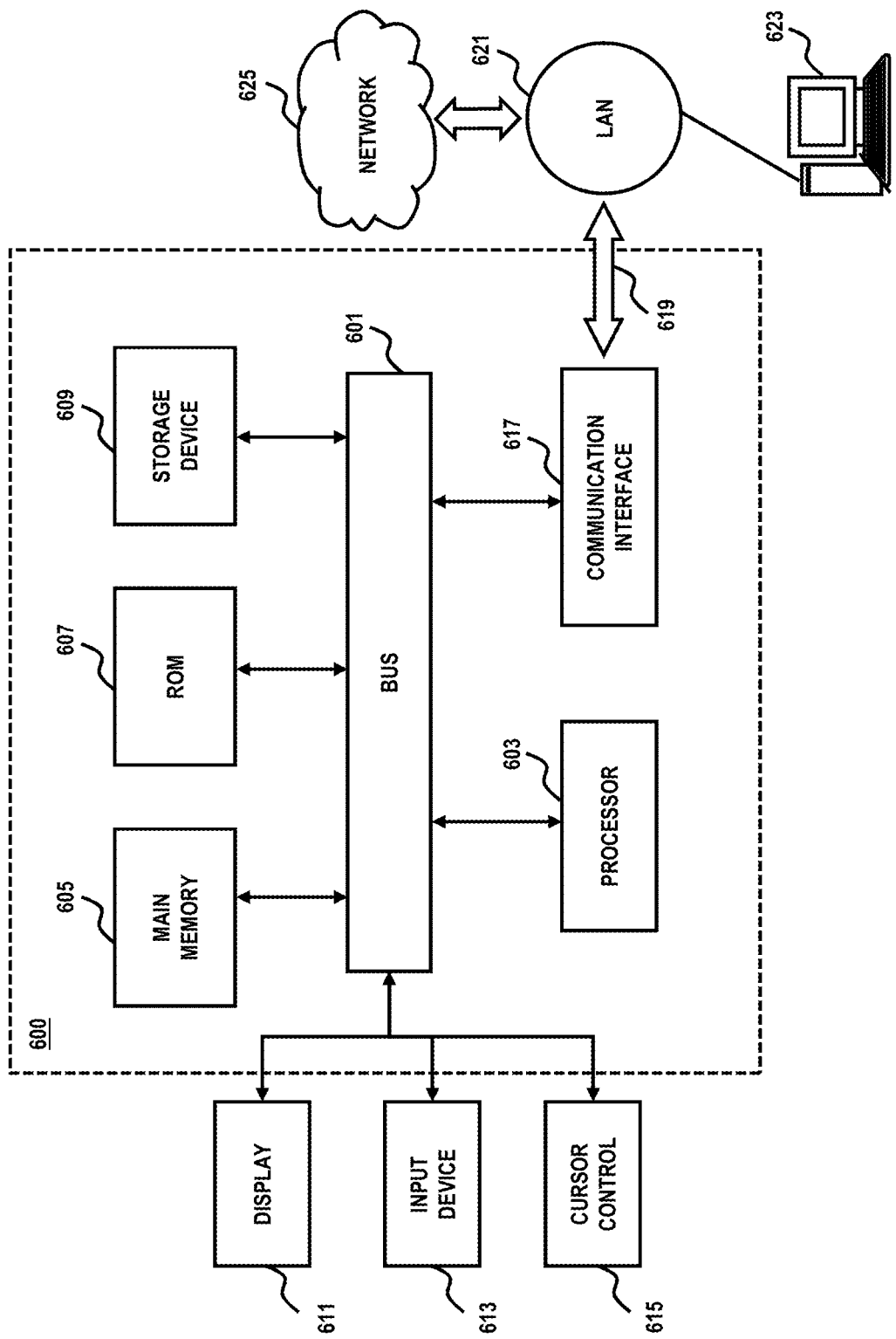
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 5A and 5B, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to enable load efficient delivery of updates and other content to mobile devices as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling load efficient delivery of updates and other content to mobile devices.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable load efficient delivery of updates and other content to mobile devices. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining by an apparatus controlled by an operator of a cellular network to communicate with a mobile device that is subscribed to cellular communication services offered by the operator and configured via firmware to operate over the cellular network and a local area network, wherein the local area network includes a customer premise gateway;
   initiating, by the apparatus, delivery of an update package to the mobile device using a unicast session over the cellular network; and
   determining, by the apparatus based upon loading of the cellular network, to off-load the delivery of the update package from the cellular network to the local area network using a multicast session via the customer premise gateway and over the local area network, wherein the update package includes code to update the firmware of the mobile device.

2. A method according to claim 1, wherein the customer premise gateway is configured to:
   map one or more data objects into a multicast group that includes the mobile device,
   wherein the data objects represent the update package, and the update package further includes code to customize one or more user interfaces at the mobile device.

3. A method according to claim 2, wherein the code customizes one or more skins, one or more icons, one or more menus, or a combination thereof, of the one or more user interfaces.

4. A method according to claim 1, wherein the update package further includes code to update software of the mobile device, the method further comprising:
   facilitating passage of data of the update package to the mobile device per an embedded device management tree architecture of the mobile device.

5. A method according to claim 4, wherein the passage of data of the update package is carried out via enabling bootstrapping execution, synchronization of the data of the update package with existing data sets, unpacking of the data, computing which memory regions to be changed per the device management tree architecture, enabling a fail-safe mechanism for update, or a combination thereof.

6. A method according to claim 1, further comprising:
   determining to avoid delivery of media over the cellular network to the mobile device; and
   initiating delivery of the media over a multicast enabled network using the multicast session to the mobile device.

7. A method according to claim 6, wherein the media includes streaming content, gaming content, advertisement information, or a combination thereof.

8. An apparatus comprising:
   at least one processor; and
   at least one memory including computer program code for one or more programs,
   the at least one memory and the computer program code configured to, with the at least one processor, cause the apparatus controlled by an operator of a cellular network to perform at least the following,
   determine to communicate with a mobile device that is subscribed to cellular communication services offered by the operator and configured via firmware to operate over the cellular network and a local area network, wherein the local area network includes a customer
   initiate delivery of an update package to the mobile device using a unicast session over the cellular network; and
   determine based upon loading of the cellular network, to off-load the delivery of the update package from the cellular network to the local area network using a multicast session via the customer premise gateway and over the local area network, wherein the update package includes code to update the firmware of the mobile device.

9. An apparatus of claim 8, wherein the apparatus is further caused to:
   retrieve an update package for the mobile device; and
   initiate delivery of the update package over the multicast session to the mobile device.

10. An apparatus of claim 9, wherein the customer premise gateway is configured to:
    map one or more data objects into a multicast group that includes the mobile device, wherein the data objects represent the update package.

11. An apparatus of claim 9, wherein the apparatus is further caused to:
    determine to off-load the delivery of the update package over the multicast session based upon loading of the cellular network.

12. An apparatus of claim 9, wherein the update package provides code to update firmware, software, or a combination thereof of the mobile device.

13. An apparatus of claim 8, wherein the apparatus is further caused to:
    determine to avoid delivery of media over the cellular network to the mobile device; and
    initiate delivery of the media over a multicast enabled network using the multicast session to the mobile device.

14. An apparatus of claim 8, wherein the media includes streaming content, gaming content, advertisement information, or a combination thereof.

15. A method comprising:
    presenting a prompt to update a mobile device that is subscribed to cellular communication services offered by the operator and configured via firmware to operate over the cellular network and a local area network; and
    generating a request to an apparatus controlled by an operator of a cellular network via a customer premise gateway and over the local area network, wherein the request is to join a multicast group to receive an update package to update the mobile device; and receiving the update package via a unicast session over the cellular network, and then receiving the update package via a multicast session via the customer premise gateway and over the local area network when the delivery of the update package is off-loaded to the local area network based upon loading of the cellular network, wherein the update package includes code to update the firmware of the mobile device.

16. A method according to claim 15, further comprising:
determining receipt of the update package; and
recording execution of the update package at the mobile device to update firmware, software, or a combination thereof of the mobile device.

17. An apparatus comprising:
at least one processor; and
at least one memory including computer program code for one or more programs, the at least one memory and the computer program code configured to, with the at least one processor, cause the apparatus to perform at least the following,
present a prompt to update a mobile device that is subscribed to cellular communication services offered by the operator and configured via firmware to operate over the cellular network and a local area network; and
generate a request to an apparatus controlled by an operator of a cellular network via a customer premise gateway and over the local area network, wherein the request is to join a multicast group to receive an update package to update the mobile device; and
receive the update package via a unicast session over the cellular network, and then receive the update package via a multicast session via the customer premise gateway and over the local area network when the delivery of the update package is off-loaded to the local area network based upon loading of the cellular network, wherein the update package includes code to update the firmware of the mobile device.

18. An apparatus of claim 17, wherein the apparatus is further caused to:
determine receipt of the update package; and
record execution of the update package at the mobile device to update firmware, software, or a combination thereof of the mobile device.

19. A system comprising:
a mobile device management platform including one or more servers configured to determine to communicate with a mobile device that is subscribed to cellular communication services offered by the operator and configured via firmware to operate over the cellular network and a local area network, wherein the local area network includes a customer premise gateway, wherein the mobile device management platform is further configured to initiate delivery of an update package to the mobile device using a unicast session over the cellular network, and configured to determine based upon loading of the cellular network, to off-load the delivery of the update package from the cellular network to the local area network using a multicast session via the customer premise gateway and over the local area network, wherein the update package includes code to update the firmware of the mobile device.

20. A system according to claim 19, further comprising:
a data source configured to provide a update package to a multicast enabled network for delivery of the update package over the multicast session to the mobile device.

* * * * *